April 23, 1963 J. W. HARFORD 3,086,707

ADD-SUBTRACT COUNTER

Filed May 5, 1961

JAMES W. HARFORD,
INVENTOR.

BY Nilsson & Robbins

ATTORNEYS.

United States Patent Office 3,086,707

Patented Apr. 23, 1963

3,086,707

ADD-SUBTRACT COUNTER

James W. Harford, 1485 Sycamore Canyon Road, Santa Barbara, Calif.

Filed May 5, 1961, Ser. No. 108,101
8 Claims. (Cl. 235—92)

The present invention relates to counters and particularly to electrical counters capable of both additive and subtractive counting.

Electrical counters are in widespread use in digital control systems and computers. In general these counters receive electrical pulses and function to count and manifest a number of received pulses.

One class of prior counters are capable of both additive and subtractive operation. That is, counters of this type receive different pulse inputs to accomplish the addition or subtraction of a unit from the contents of the counter.

Prior add-subtract counters have customarily employed a rather complex system of electrical logic networks, or have required complex electro-mechanical apparatus. Therefore, prior systems of this type have been somewhat expensive to manufacture and maintain.

In general, the present invention comprises a digital add-subtract counter which employs two simple step counters interconnected with a logic circuit to accomplish each stage of counting. In these stages, one counter receives increment pulses commanding an increase in the registered value, and both counters receive decrement pulses commanding a decrease in the registered value. Several stages may then form a multi-stage counter by interconnecting the stages with circuits to accommodate carry-digit signals between the states.

An object of the present invention is to provide an improved add-subtract counter.

Another object of the present invention is to provide an add-subtract counter which may be economically manufactured and maintained.

Still another object of the present invention is to provide a decimal add-subtract counter capable of registering several digits and operating with relatively low power requirements.

A further object of the present invention is to provide a decimal digital add-subtract counter which may be economically embodied in an electro-mechanical form.

Figure 1:
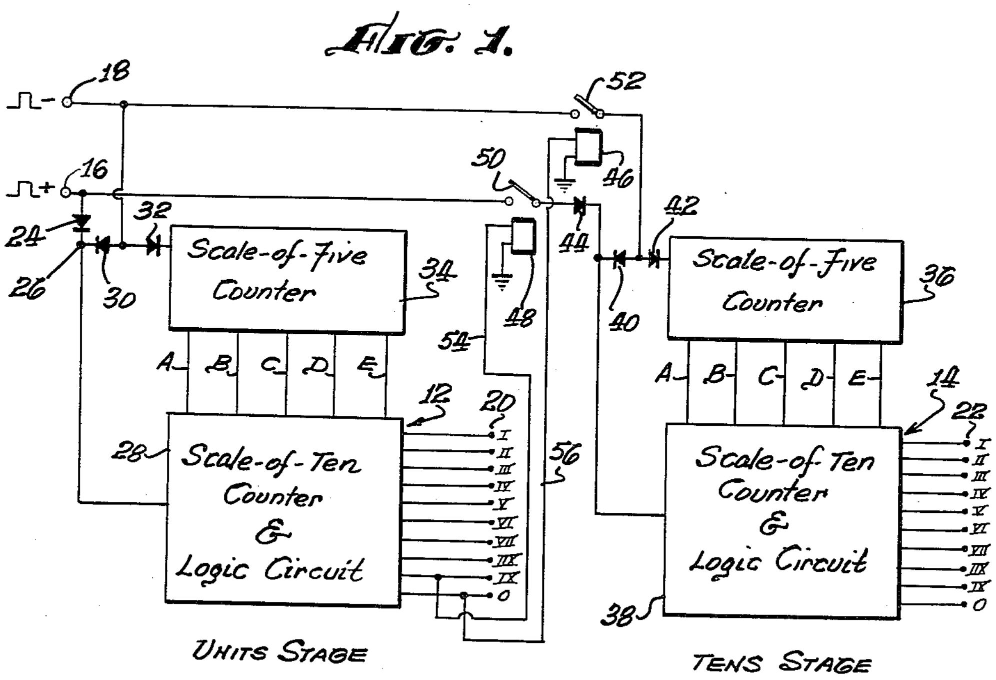
Figure 2:
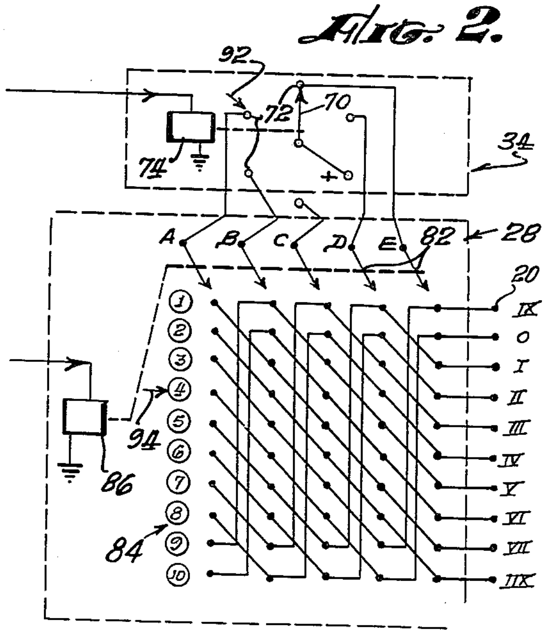

These and other objects of the present invention will be apparent from a consideration of the following, taken in conjunction with the drawings, wherein:

FIG. 1 is a diagrammatic view of a multi-stage counter constructed in accordance with the present invention; and FIG. 2 is a detail schematic diagram of a single stage of the system of FIG. 1.

Referring to FIG. 1, there are shown two decimal stages; stage 12 for registering units digits from "zero" to "nine" and stage 14 for registering tens digits from "zero" to "nine." Of course additional stages could be provided to register hundreds digits and so on; however, the manner of connecting such stages is similar to the single connection illustrated in FIG. 1 and explained below. Therefore, the disclosure of two stages of the counter is deemed to extend the coverage hereof to any number of added stages.

Input signals in the form of positive pulses are applied to the counter system through terminals 16 and 18, and the contents of each stage is manifest by signals appearing on sets of terminals 20 and 22. The individual terminals in each set are identified by Roman numerals through IX and a voltage appears at each such terminal to indicate the digit by which the terminal is identified. In this manner, the terminals 20 indicate the value of the units digit while the terminals 22 indicate the value of the tens digit. Of course, other display means or manifesting devices can be coupled to the terminals.

The positive pulses applied to the terminals 16 and 18 are representative of "add" and "subtract" units. That is, pulses applied at the terminal 16 represent a positive unit and command the counter to increment its contents by "one." Pulses applied at the terminal 18 represent negative units and command the counter to decrement its contents by "one."

To provide signals to the counter stage 12, the terminal 16 is connected through a diode 24 to a junction point 26, which is in turn connected to the input of a block 28. The junction point 26 is also connected through a diode 30 to the terminal 18 so that the block 28 receives positive pulses applied at either of the terminals 16 or 18.

The block 28 represents a scale-of-ten step counter and a logic circuit, one form of which is considered in detail below. Functionally, the circuits in the block 28 selectively energize one of the terminals 20 to manifest the contents of the units counter stage 12. This operation is accomplished under control of the counter contained in the block 28 and signals from a scale-of-five step counter 34 which is connected to the terminal 18 through a diode 32.

The counter 34 has five output conductors which are designated A, B, C, D and E, and connected to the block 28. In the operation of the system one of these conductors exclusively receives a high signal from the counter 34, depending upon which of the possible five states the counter occupies, which is determined by the number of pulses received by the counter from the terminal 18.

The tens stage 14 of the system FIG. 1 is generally similar to the units stage 12. Specifically, the tens stage includes a scale-of-five step counter 36 which provides a signal in one of five outputs to a block 38 containing a scale-of-ten step counter and a logic circuit for selectively energizing one of the set of output terminals 22 (also designated 0 through IX) to manifest a decimal digit. The scale-of-five counter 36 receives pulses through a diode 42, while the block 38 receives pulses through both diodes 40 and 44. These pulses are received from the terminals 16 and 18; however, their application to the counter 36 and the block 38 is controlled by relays 46 and 48. Specifically, the terminal 16 is connected through the contacts 50 (of relay 48) and diode 44 to the block 38. The terminal 18 is connected through contacts 52 (of relay 46) then through the diode 42 to the counter 36 and through the diode 40 to the block 38. The relay 48 is energized through a conductor 54 which is connected to the terminal IX in the set of terminals 20. The relay 46 is similarly energized through a conductor 56 connected to the terminal 0. Therefore, the input pulses may pass to the tens stage 14 only when the units stage 12 undergoes a change of tens digit significance.

Considering the operation of the system of FIG. 1, as indicated above, each pulse applied to the terminal 16 increases the count by "one" while each pulse applied at the terminal 18 decreases the count by "one." Considering this operation in detail, each "add" pulse received at terminal 16 is applied through the diode 24 to the block 28 and isolated from the counter 34 by the diode 30. These pulses step the scale-of-ten counter (as considered in detail below) causing the next higher digit to be manifest by the terminals 20.

Upon the occurrence of a "subtract" pulse at the terminal 18, it is applied to both the counter 34 and the block 28 through diodes 32 and 30 respectively. As a result, both of the counters are stepped which results in the formation of signals that are decoded by the logic circuit (as described below) to cause the signal at the terminals 20 to manifest the next-lower digit.

In the instance when the units stage 12 reaches a value of "nine" (manifest by a high signal at the terminal IX) it is apparent that the receipt of another "add" pulse will cause the stage to return to "zero" by energizing the terminal 0. Therefore to accommodate this change the value manifest by the tens stage 14 should be increased by "one." Such operation is accomplished by the signal at the terminal IX energizing the relay 48 to close the contacts 50. Therefore, upon the occurrence of an "add" pulse when the units stage indicates "nine" such pulse passes through the contacts 50, and the diode 44 to step the counter in the block 38, thereby advancing the value manifest by "one."

If the system receives a "subtract" pulse at the terminal 18 while the relay 48 is energized, the pulse is applied to the counter 34 and the block 28 through diodes 32 and 30 respectively. However, this pulse is prevented from reaching the tens stage 14 by the diode 24. Therefore, the units stage 12 steps down to indicate "eight" while the tens stage 14 remains unchanged.

As the system subtracts as well as adds, it is necessary to provide for subtractive carry digits between the stages. That is if the units stage 12 manifests a "zero" and a "subtract" pulse is received, the value indicated by the units stage must be changed to "nine" and the value in the tens stage 14 also decreased by "one." This operation is accomplished through the relay 46.

At a time when the units stage 12 registers and indicates "zero" the signal at the terminal 0 is high to energize the relay 46 through the conductor 56. Then upon the occurrence of a "subtract" pulse at the terminal 18, the pulse is applied to: the counter 34 and the block 28 through diodes 32 and 30, and the counter 36 and block 38 through diodes 42 and 40. Therefore both stages 12 and 14 perform a subtractive operation to accommodate a change of significance in the tens digit.

From the above description it is apparent that a system of the present invention is capable of additive and subtractive counting with proper manipulation of the carry digits between individual stages. Of course, the actual structure employed as the scale-of-five step counters 34 and 36 and the blocks 28 and 38 may vary widely. For example, the counters may comprise stepping switches or ring counters. Similarly, the blocks may include stepping switches or ring counters coupled to various logic circuits. Considering one exemplary structure for these units, reference will now be made to FIG. 2 which shows counter 34 and block 28 in detail.

In FIG. 2, the counter 34 takes the form of a five-position stepper switch wherein a single rotatively mounted contact may be cyclically stepped or advanced through five stable positions or states to engage five stationary contacts 72. The movement from one stationary contact 72 to another by the movable contact 70 is accomplished by a relay coil 74 which receives the input to the counter 34.

The movable contact 70 is connected to a source of positive potential while the stationary contacts 72 are connected individually to the conductors A, B, C, D and E. Therefore, depending upon the initial setting of the movable contact 70, and the number of pulses applied to coil 74, one of the conductors A, B, C, D or E is energized. It is to be noted that the state or dwell position of the movable contact 70 which energizes the conductor A may be considered the "zero" position.

The output conductors A, B, C, D and E from the counter 34 are individually connected to the movable contacts of a gang stepper switch having five movable contacts 82 which are mechanically interconnected to be positioned in any one of ten stable positions. The movable contacts 82 engage rows 84 of stationary contacts in any of ten states or positions (designated by rows 1 through 10) under control of a relay coil 86. The input to the stepper switch or electro mechanical counter is applied to the relay coil 86 so that each time the coil is pulsed, the movable contacts advance to engage the next-higher row of stationary contacts as designated by numerals 1 through 10. Upon reaching row 10, the next pulse applied to the coil causes the movable contacts 82 to return to row 1. The home position indicating "zero" may be considered row 4.

The individual stationary contacts are interconnected by a logic network which selectively energizes one of the output terminals 20 in accordance with the combined states or positions of the two step counters.

The operation of the unit may be best preliminarily considered by assuming an initial condition and pursuing some exemplary operations. Therefore, assume that the conductor B is energized and that the movable contacts 82 engage row 2. In this instance, the current from the conductor B flows to a stationary contact in row 2 then diagonally across other contacts to terminal VI, to manifest a value of "six."

If an "add" pulse is now applied to the unit, the relay coil 86 is pulsed to advance the movable contacts 82 to row 3. The conductor B remains energized so that current now flows from the conductor B to a stationary contact in row 3, then diagonally to the terminal VII manifesting a "seven" ("six" plus "one"). Thus by energizing only the relay coil 86, the value manifest by the unit is increased by "one."

With the unit in this state, assume that a "subtract" pulse is received, which energizes both of the relay coils 74 and 86 to advance the contact 70 to energize the conductor C and advance the contacts 82 to row 4. The energized conductor C now engages a contact in row 4 to thereby energize terminal VI, indicating "six" ("seven" minus "one"). Thus by energizing both the relay coils 72 and 86 the value manifest is diminished by "one."

Similar tests will verify that the unit invariably functions in the manner to additively and substractively count under the control of electrical pulses. Of course, various other structures may be substituted for the logic circuits employed in the unit of FIG. 2. However, in general, such circuits function to perform the logic operations defined by the following logic equations:

$$O=A4+B6+C8+D10+E2$$
$$I=A5+B7+C9+D1+E3$$
$$II=A6+B8+C10+D2+E4$$
$$III=A7+B9+C1+D3+E5$$
$$IV=A8+B10+C2+D4+E6$$
$$V=A9+B1+C3+D5+E7$$
$$VI=A10+B2+C4+D6+E8$$
$$VII=A1+B3+C5+D7+E9$$
$$VIII=A2+B4+C6+D8+E10$$
$$IX=A3+B5+C7+D9+E1$$

In the above equations, the Roman numerals indicate the digit values manifest and the terminals energized to manifest such values. The letters A, B, C, D and E indicate the conductors identified by such letters and the numerals 1 through 10 indicate the rows of contacts so identified. The logic operations are then defined in a conventional manner. For example, the first equation indicates that a "zero" 0 is manifest if the signal in conductor A is high and the gang switch is in position 4, or conductor B is energized and the gang switch is in position 6, or conductor C is energized and the gang switch is in position 8, or the conductor D is energized and the gang switch is in position 10, or the conductor E is energized and the gang switch is in position 2. The other equations indicate the logic involved in each of the other decimal values I through IX.

It is to be noted that one of the several positions for the step switches which designate "zero" may be considered the home position, as the position when the conductor A is energized and the contacts 82 engage the 0 in row 4. Manual or automatic means may be included to reset the counter stages to this home position, as indicated by arrows 92 and 94.

From a consideration of the above, it is apparent that the system functions as an add-subtract digital counter to accommodate positive and negative changes. The illustrated system employs a decimal number system, however, it is apparent that the system could employ other systems of numbers, as by providing at least as many states in the counter 28 as the radix of the system of numbers employed. Of course, the number of states or counts of the counter 34 would then be less than the radix, e.g. five in the case of radix ten.

An important feature of the invention resides in the provision of a relatively-simple and economical system capable of additive and subtractive counting.

Although various other features and concepts of the present invention have been set forth in the foregoing illustrative embodiment, the present invention is not to be limited in accordance therewith but is to be constructed in accordance with the claims set forth below.

What is claimed is:

1. A digital add-subtract counter stage for accumulating values in a numerical system, comprising:
   - a first counter including a number of stable states coinciding to the radix of said numerical system and a number of contacts for each state coinciding to one half said radix;
   - a second counter including a number of stable states coinciding to one half the radix of said numerical system;
   - means for advancing the state of said first counter to increment the contents of the counter stage;
   - means for advancing the state of both of said counters to decrement the contents of the counter stage;
   - a logic circuit for detecting the various states of said first and second counters to manifest a digit in said numerical system.

2. Apparatus including a plurality of counter stages as set forth in claim 1 and means interconnecting said stages to transfer signals between said stages representative of carry digits.

3. Apparatus according to claim 1 wherein said first and second counters comprise electro-mechanical stepping counters wherein movable contacts are variously positioned to engage stationary contacts depending upon the state of the counter.

4. Apparatus according to claim 1 wherein said logic circuit comprises a system for incrementing the numerical value manifest upon the advancement of said first counter, and decrementing the numerical value manifest upon the advancement of both of said counters.

5. A digital add-subtract counter for counting add type electrical signals representative of positive units and subtract type electrical signals representative of negative units, comprising: a first step counter including a plurality of movable contacts less than the radix of the system of numbers employed, means energizable to step said plural movable contacts collectively through a plurality of active states coinciding in number to the radix of the system of numbers employed, a plurality of stationary contacts in said first counter to engage each of said movable contacts in each of said states, a second step counter including a movable contact adapted to be connected to a source of potential, means energizable to step said movable contact through a plurality of active states, coinciding in number to the plurality of movable contacts of said first counter, a group of stationary contacts in said second counter to engage said movable contacts in each of said states, means connecting said movable contacts in said first counter to said stationary contacts in said second counter, means for energizing one of said step counter means upon receiving one type signals and energizing both of said counter means upon receiving the other type signals, a plurality of output terminals coinciding in number to the radix of the system of numbers employed, means connecting each of said output terminals to one of said stationary contacts for each of said states of said first step counter whereby one of said output terminals is exclusively energized to manifest a value.

6. Apparatus including a plurality of structures as set forth in claim 5, each for manifesting one numerical order, a plurality of switch means coinciding to one less than the number of said structures and each connected for control to certain of said output terminals from one of said structures, and means connecting the second and higher order structures through said switching means to receive said signals.

7. A digital add-subtract counter for counting add type electrical signals representative of positive units and subtract type electrical signals representative of negative units, comprising: a first step counter including a plurality of movable contacts coinciding to one half the radix of the system of numbers employed, means energizable to step said plural movable contacts collectively through a plurality of active states coinciding in number to the radix of the system of numbers employed, a plurality of stationary contacts in said first counter to engage each of said movable contacts in each of said states, a second step counter including a movable contact adapted to be connected to a source of potential, means energizable to step said movable contact through a plurality of active states, coinciding in number to the plurality of movable contacts of said first counter, a group of stationary contacts in said second counter to engage said movable contacts in each of said states, means connecting said movable contacts in said first counter to said stationary contacts in said second counter, means for energizing one of said step counter means upon receiving one type signals and energizing both of said counter means upon receiving the other type signals, a plurality of output terminals coinciding in number to the radix of the system of numbers employed, and means connecting each of said output terminals to one of said stationary contacts for each of said states of said first step counter whereby one of said output terminals is exclusively energized to manifest a value.

8. A digital add-subtract counter for counting add type electrical signals representative of positive units and subtract type electrical signals representative of negative units, comprising: a first step counter including a plurality of movable contacts coinciding to one half the radix of the system of numbers employed, means energizable to step said plural movable contacts collectively through a plurality of active states coinciding in number to the radix of the system of numbers employed, a plurality of stationary contacts in said first counter to engage each of said movable contacts in each of said states, a second step counter including a movable contact adapted to be connetced to a source of potential, means energizable to step said movable contact through a plurality of active states, coinciding in number to the plurality of movable contacts of said first counter, a group of stationary contacts in said second counter to engage said movable contacts in each of said states, means connecting said movable contacts in said first counter to said stationary contacts in said second counter, means for energizing one of said step counter means upon receiving one type signals and energizing both of said counter means upon receiving the other type signals, a plurality of output terminals coinciding in number to the radix of the system of numbers employed, and means connecting each of said output terminals to one of said stationary contacts for each of said states, the terminals each connected to contacts displaced by two states in said first step counter from the next connected contacts, whereby one of said output terminals is exclusively energized to manifest a value.

References Cited in the file of this patent

UNITED STATES PATENTS 2,964,743 Bange ---------------- Dec. 13, 1960

FOREIGN PATENTS 789,506 Great Britain ----------- Jan. 22, 1958